(12) United States Patent
Bai et al.

(10) Patent No.: US 11,732,684 B2
(45) Date of Patent: Aug. 22, 2023

(54) OCEAN CURRENT VORTEX-INDUCED VIBRATION POWER GENERATION DEVICE

(71) Applicant: JIANGSU UNIVERSITY OF SCIENCE AND TECHNOLOGY, Zhenjiang (CN)

(72) Inventors: Xu Bai, Zhenjiang (CN); XiaoFang Luo, Zhenjiang (CN); ZhiBin Le, Zhenjiang (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 33 days.

(21) Appl. No.: 16/626,580

(22) PCT Filed: Dec. 12, 2018

(86) PCT No.: PCT/CN2018/120625
§ 371 (c)(1),
(2) Date: Dec. 26, 2019

(87) PCT Pub. No.: WO2020/093515
PCT Pub. Date: May 14, 2020

(65) Prior Publication Data
US 2021/0332787 A1  Oct. 28, 2021

(30) Foreign Application Priority Data
Nov. 6, 2018 (CN) .......................... 201811321766.4

(51) Int. Cl.
| F03B 13/10 | (2006.01) |
| H02K 7/18 | (2006.01) |
| F03B 13/26 | (2006.01) |

(52) U.S. Cl.
CPC ............ *F03B 13/10* (2013.01); *F03B 13/264* (2013.01); *H02K 7/1876* (2013.01)

(58) Field of Classification Search
None
See application file for complete search history.

(56) References Cited

U.S. PATENT DOCUMENTS

| 7,208,845 B2 | 4/2007 | Masters et al. |
| 9,222,465 B2 * | 12/2015 | Thorp ....................... F03D 5/00 |
| (Continued) | | |

FOREIGN PATENT DOCUMENTS

| CN | 2840499 Y | 11/2006 |
| CN | 204119002 U | 1/2015 |
| (Continued) | | |

*Primary Examiner* — Tulsidas C Patel
*Assistant Examiner* — S. Mikailoff
(74) *Attorney, Agent, or Firm* — NKL Law; Allen Xue

(57) ABSTRACT

A vortex-induced vibration power generation device with a magnetic boundary structure, including upper and lower opposite groups of fixed sleeves. Each fixed sleeve includes two vertical sleeves. The vertical sleeves are hollow cavities, and include sealed ends and open ends. Rotating magnetic poles are arranged in the sealed ends of the vertical sleeves. Coil slots are formed in the inner walls of the vertical sleeves. Coil windings are mounted in the coil slots. The vortex-induced vibration power generation device further includes linear bearings. The end portions of the linear bearings are fixedly connected with the open ends of the vertical sleeves through flanges. A vibration mechanism includes a vibration rod and vibration guide rods fixedly connected with the vibration rod. Magnetic coil mounting slots and anti-falling rings are arranged on the vibration guide rods. Magnetic coils are mounted in the magnetic coil mounting slots.

2 Claims, 15 Drawing Sheets

(56) References Cited

U.S. PATENT DOCUMENTS

2004/0085223 A1    5/2004  Winnacker et al.
2014/0175800 A1*   6/2014  Thorp .................... F03D 7/00
                                                     290/55

FOREIGN PATENT DOCUMENTS

| CN | 104564492 A | 4/2015 |
| CN | 105242206 A | 1/2016 |
| CN | 105840426 A | 8/2016 |
| CN | 105846644 A | 8/2016 |
| CN | 205423052 U | 8/2016 |
| CN | 106877572 A | 6/2017 |
| CN | 107733285 A | 2/2018 |
| CN | 207393377 U | 5/2018 |
| DE | 19604089 A1 | 8/1997 |
| EP | 3270494 A1 | 1/2018 |
| WO | 2008/005821 A2 | 1/2008 |
| WO | 2016/074003 A1 | 5/2016 |

* cited by examiner

OCEAN CURRENT VORTEX-INDUCED VIBRATION POWER GENERATION DEVICE

TECHNICAL FIELD

The present invention relates to a vortex-induced vibration power generation device with magnetic boundary which can be converted with motion amplitude. The power generation device uses ocean current energy to generate power from vortex-induced vibration, which belongs to the technical field of power generation devices.

BACKGROUND ART

With the continuous exploitation and consumption of earth's resources and energy, and with resources on land becoming less and less available, mankind has turned to the ocean for resources. In addition to natural resources such as oil from the seabed, the energy contained in the ocean itself is also a great treasure. Due to the continuous influence of tides and monsoons, ocean current energy and tidal energy have become the most accessible and consistently available energy source in ocean energy.

Vortex-induced vibration is a common vibration phenomenon in nature. When fluid (air, water) passes through a blunt structure, the change of lift force caused by the shedding of the trailing vortex causes reciprocating motion of the blunt structure. The vortex-induced vibration is usually a destructive phenomenon as it absorbs the kinetic energy of the fluid and converts the kinetic energy into energy to destroy the structure. However, if the vibration energy can be effectively converted into electrical energy, its potential energy will be immeasurable.

Traditional vortex-induced vibration power generation device is usually that two ends of a vibration rod are connected by springs. This kind of vibration boundary has low spring reliability during long-term vibration and the spring is inevitably bumped during vibration. Once the anti-corrosion layer of the spring is damaged, the spring will rapidly rust in the seawater environment that destroys its performance. Therefore, it is necessary to develop a vortex-induced vibration power generation device having a magnetic boundary.

SUMMARY OF THE INVENTION

The present invention provides a vortex-induced vibration power generation device with magnetic boundary with amplitude conversion. The power generation device can overcome the shortcomings of short service life and poor reliability of a spring boundary of a conventional vortex-induced vibration power generation device in the service process. The power generation device of the present invention uses the principle of homogeneous repulsion of magnets to provide damping of the vibration boundary as the boundary of the vortex-induced vibration power generation device.

The power generation device of the present invention has the advantages of amplifying the amplitude and increasing the service life of the device and can convert mechanical energy of vibration generated in seawater into the relative motion between a power generating coil and a ring-shaped magnet to generate electrical energy by cutting magnetic induction lines.

In order to solve the above technical problem, the technical solution adopted in the present invention is as following:

a vortex-induced vibration power generation device with magnetic boundary with amplitude conversion comprising two fixed sleeves arranged opposite to each other up and down, is proposed. Each of the fixed sleeves includes a horizontal connection rod and two vertical sleeves connected by the horizontal connection rod. Each of the vertical sleeves is a hollow structure including a sealed end and an open end. A reversible magnet is provided in the sealed end of the vertical sleeve. The inner wall near the open end of the vertical sleeve is provided with a coil groove. The power generating coil is mounted in the coil groove. the vortex-induced vibration power generation device further comprises a linear bearing, an end of the linear bearing is fixedly connected with the open end of the vertical sleeve through a flange provided at its open end, and the vertical sleeve is mounted concentrically with the linear bearing. A guide rail is further provided in the linear bearing. The vortex-induced vibration power generation device further comprises a vibration device, the vibration device including a vibration rod and a vibration guide rod fixedly connected with the vibration rod. The vibration guide rod consists of an upper guide rod and a lower guide rod each of the upper and lower guide rods is provided with an anti-release ring and a ring-shaped magnet mounting groove. A ring-shaped magnet is mounted in the ring-shaped magnet mounting groove. The end of the vibration guide rod is provided with a fixed magnet and a shift fork structure for driving the reversible magnet to rotate. The upper guide rod and the lower guide rod of the vibration guide rod respectively extend into the two fixed sleeves arranged opposite to each other up and down. The vibration device is used to convert ocean current energy into mechanical energy in the form of vortex-induced vibration.

Wherein, the reversible magnet comprises a rotation shaft; a spring is provided on the rotation shaft in a sleeving manner; one end of the spring is fixedly connected with the side wall of a cavity in the vertical sleeve, and the other end of the spring is fixedly connected with the reversible magnet; and the reversible magnet is provided with shift lever on the outer circumferences of the rotation shaft.

Furthermore, four shift levers are provided, and equidistantly arranged on the outer circumference of the rotation shaft.

Wherein, further comprising a base and a rack, the rack comprise a leg and a sleeve fixed on the leg; the leg is fixed on the base, and the sleeve is fixedly set on the upper fixed sleeve in a sleeving manner.

Wherein, the linear bearing is cylindrical, a plurality of grooves are provided in the linear bearing; and balls are mounted in the grooves; and a Y-shaped sealing ring is provided at openings of the linear bearing.

Wherein, the outer diameters of the anti-release ring on the vibration guide rod is same as the inner diameter of the vertical sleeve; the outer diameter of the anti-release ring and the inner diameter of the vertical sleeve are larger than the inner diameter of the linear bearing. In case of vibration, the linear bearing is fixedly connected with the fixed sleeve through the flange, and the vibration guide rod cannot fall off from the fixed sleeve in the presence of the linear bearing.

Compared with the prior art, the technical solution of the present invention has the following beneficial effects.

Firstly, a vibration frequency of the vortex-induced vibration power generation device is at a stable value for a long time, and the device is located in a seawater corrosion environment for a long time, so that the magnetic boundary is higher in reliability and longer in service life than that in traditional spring boundary.

Secondly, most energy is consumed by springs of the traditional spring boundary in a vibration process. For example, in downward vibration, the pressed reactive force of the lower spring needs to be resisted, and the pulled reactive force of the upper spring needs to be born.

However, the magnetic boundary is on the contrary. After upward motion, the magnetic boundary provides one downward acting force which pushes the vibration rod to move downwards, so that greater motion amplitude may be generated, and thus an effect of amplifying the vibration energy is achieved.

Thirdly, the device of the present invention may provide a repulsive force through cooperation between shift forks and the reversible magnet, and also provide an upward attractive force by changing rotating phases of the reversible magnet.

Finally, the present invention would replace the vibration rods, the magnetic poles and vibration distances of the vibration guide rods according to the condition of an actual water area, and is high in environmental adaptability.

DETAILED DESCRIPTION OF THE INVENTION

The technical solution of the present invention is further described below with reference to specific embodiments.

Figure 1:
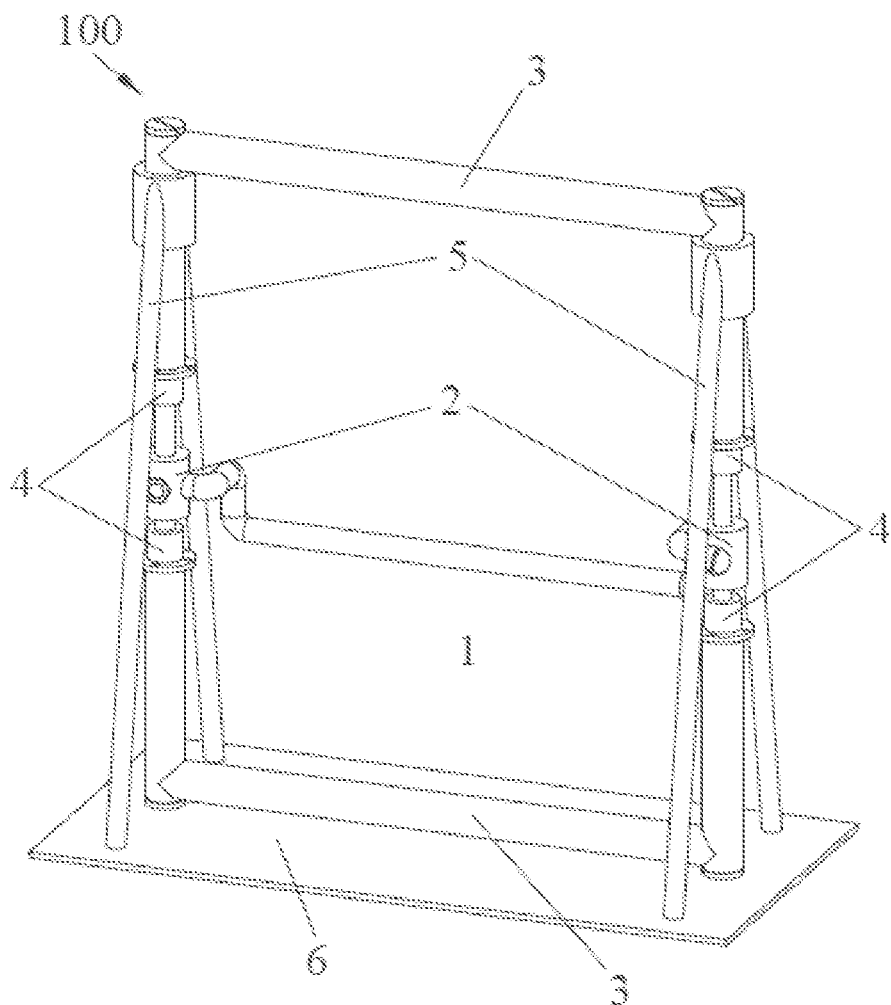
FIG. 1 is a schematic diagram of the structure of a device of the present invention.
Figure 2:
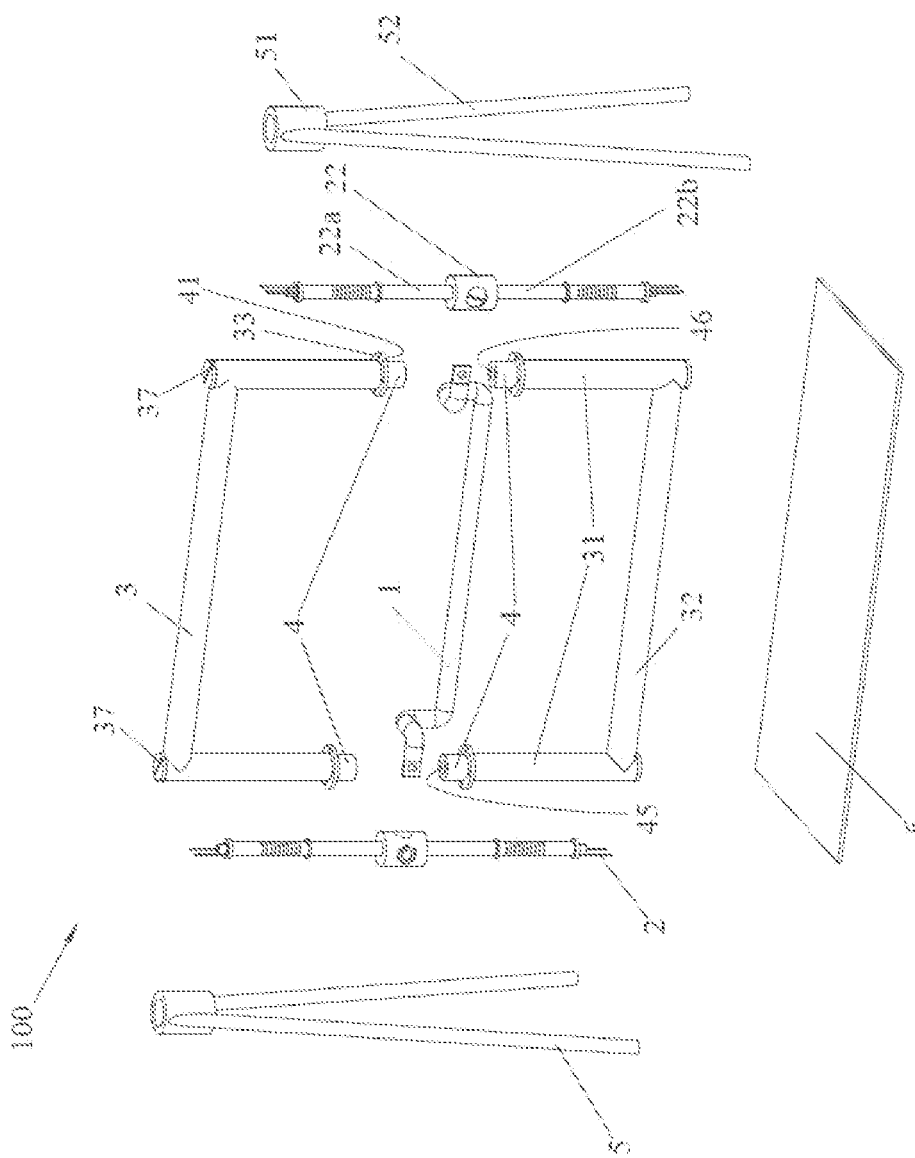
FIG. 2 is an exploded view of the structure of a device of the present invention.
Figure 3:
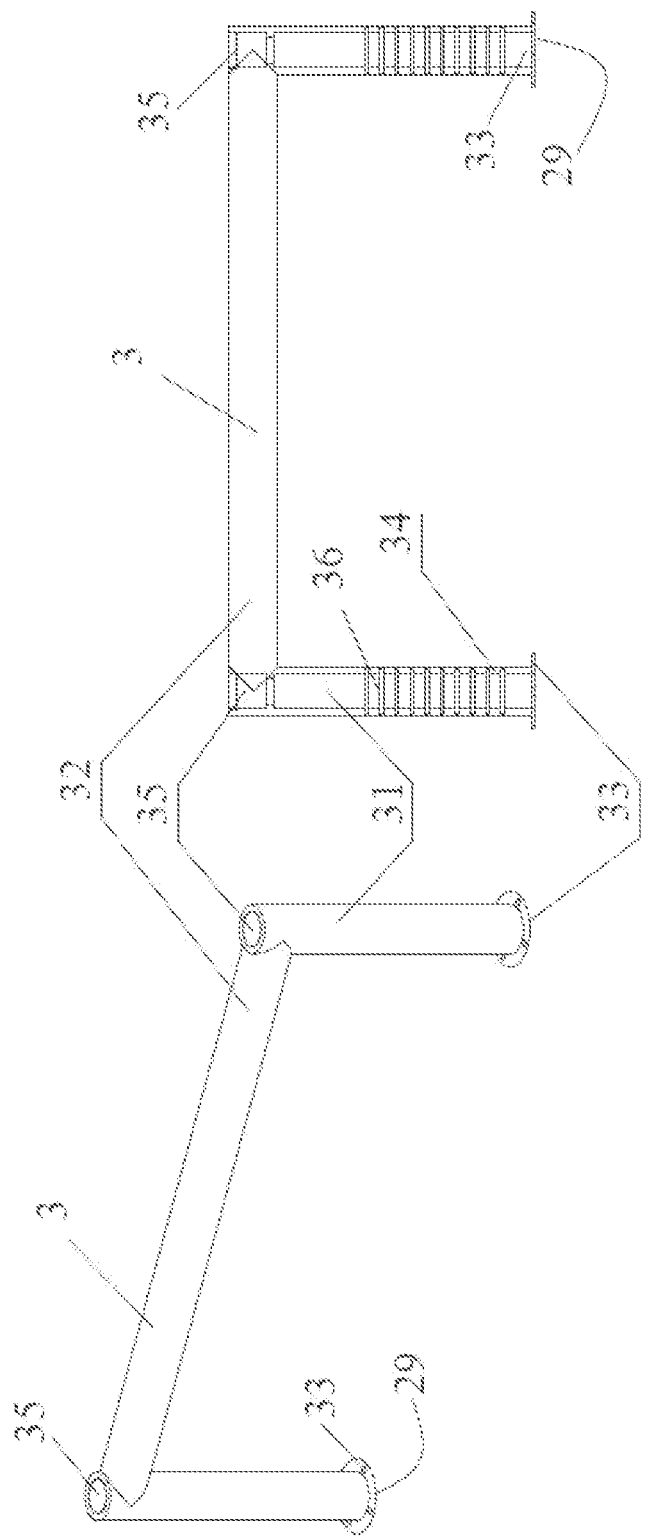
FIG. 3 is a diagram of the structure of a fixed sleeve of the present invention.
Figure 4:
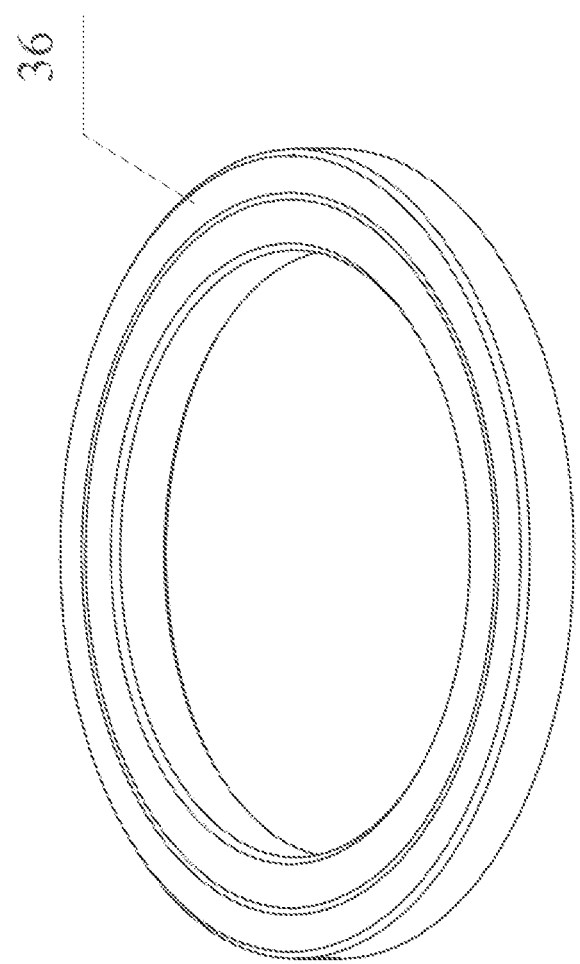
FIG. 4 is a schematic diagram of the structure of a power generating coil of the present invention.
Figure 5:
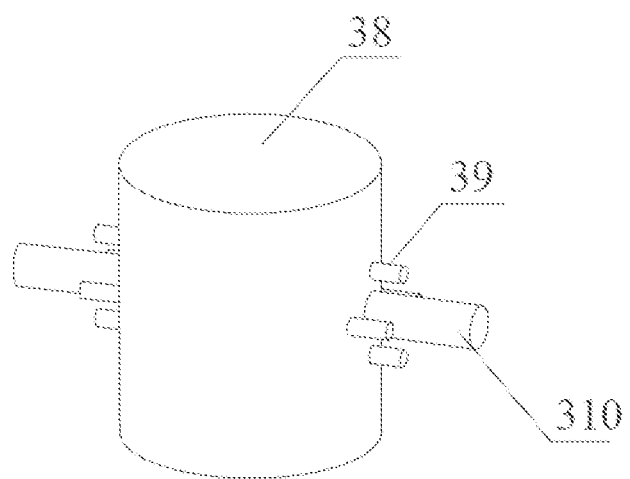
FIG. 5 is a schematic diagram of the structure of a reversible magnet of the present invention.
Figure 6:
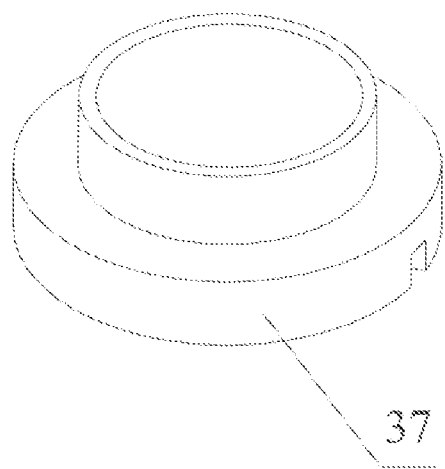
FIG. 6 is a schematic diagram of the structure of a sealing cover of the present invention.

Referring to FIGS. 1-3, a vortex-induced vibration power generation device 100 with a magnetic boundary structure with amplitude conversion of the present invention includes two sets of fixed sleeves 3 arranged opposite to each other up and down. Each fixed sleeve 3 includes a horizontal connection rod 32 and two vertical sleeves 31 connected by the horizontal connection rod 32. The vertical sleeve 31 is a hollow cavity and includes a sealed end 35 and an open end 29. A reversible magnet 38 is provided in the sealed end 35 of the vertical sleeve 31, and the connection flange 33 is provided at the open end 29 of the vertical sleeve 31. The sealing cover 37 is provided outside of the sealed end 35 for sealing the sealed end 35. The inner wall near the open end 29 of the vertical sleeve 31 is provided with the coil groove 34, and the power generating coil 36 is installed in the coil groove 34, as shown in FIG. 3 to FIG. 6.

Figure 7:
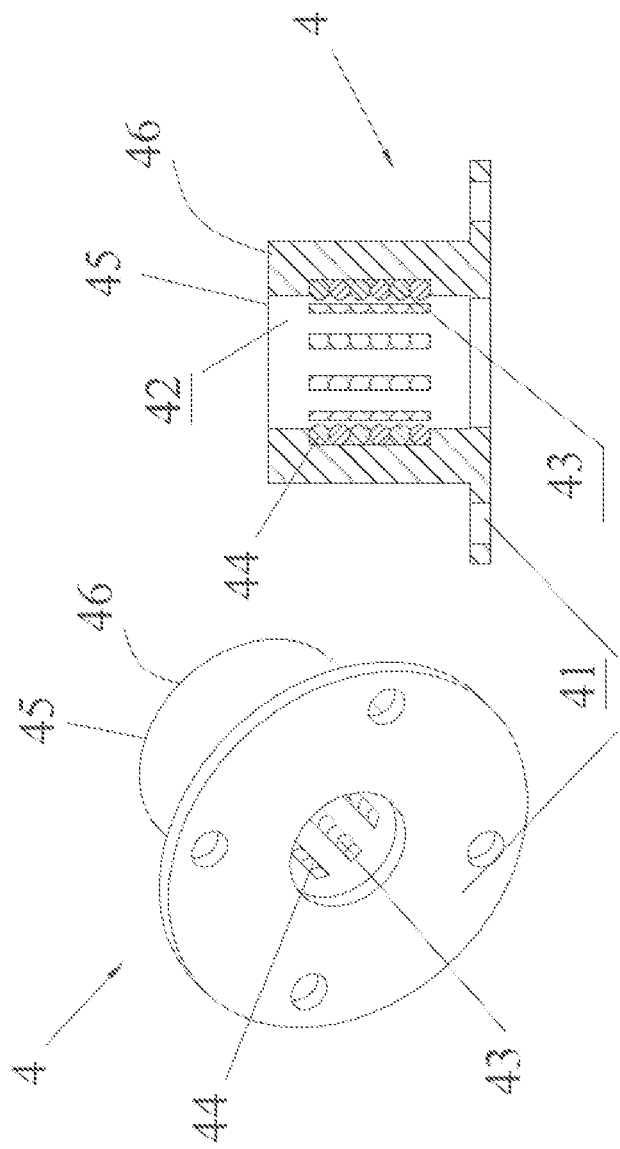
FIG. 7 is a schematic diagram of the structure of a linear bearing of the present invention.
Figure 8:
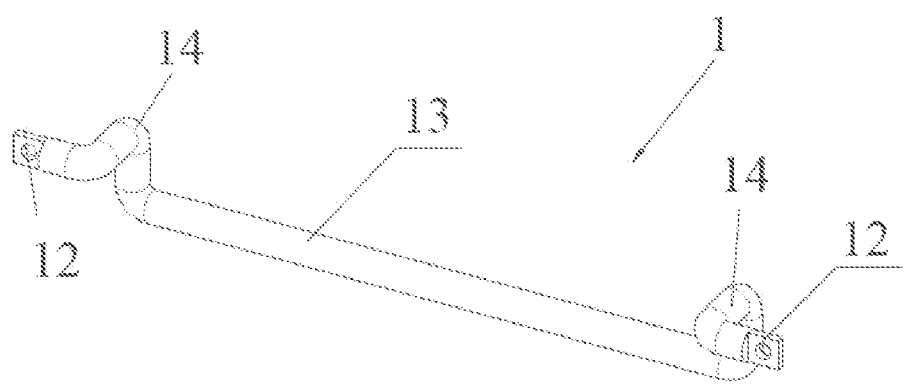
FIG. 8 is a schematic diagram of the structure of a vibration rod of the present invention.

Referring to FIG. 7, the device 100 of the present invention further includes linear bearings 4. One end of the linear bearing 4 is provided with a flange 41. The linear bearing 4 is fixedly connected with the open end 29 of the vertical sleeve 31 through the flange 41 (fixedly connected with the connection flange 33 through the flange 41) as shown in FIG. 2. The linear bearing 4 has a cylindrical shape with the flange 41 at the bottom of the circular sleeve and its inner side is in the form of axial movement. The guide rail 42 is provided in the linear bearing 4. The linear bearing 4 is also provided with a plurality of grooves 44 on its inner wall, and a plurality of balls 43 are mounted in the grooves 44. The linear bearing 4 further includes an open end 45 opposite of the flange 41, the open end 45 is provided with a Y-shaped sealing ring 46. The linear bearing 4 is used to restrict the longitudinal movement of the vibration guide rod 2 in the fixed sleeve 3 (in the cavity of the vertical sleeve 31). That is the guide rail 42 restricts the longitudinal movement of the vibration guide rod 2, and the ball 43 is used to reduce the dry friction caused by vibration.

Figure 9:
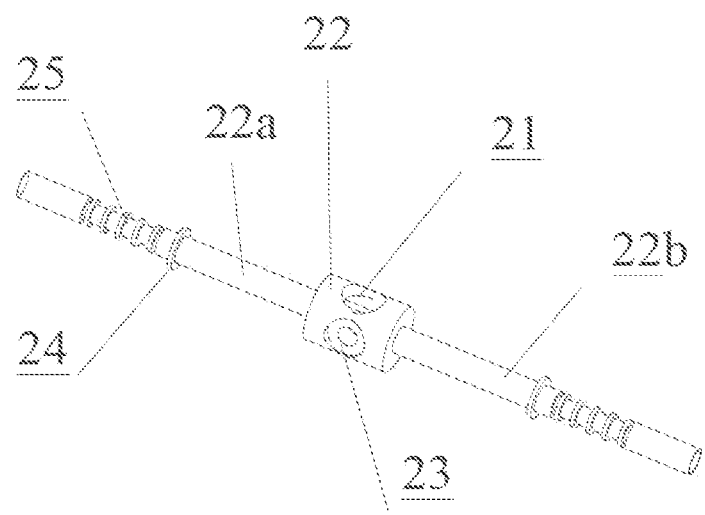
FIG. 9 is a schematic diagram of the structure of a vibration guide rod of the present invention.
Figure 10:
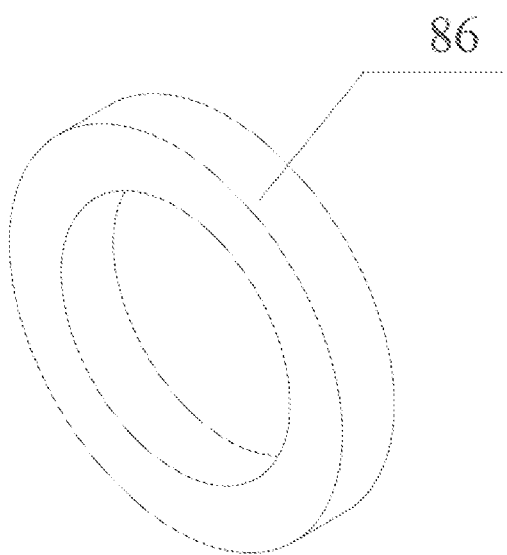
FIG. 10 is a schematic diagram of the structure of a ring-shaped magnet of the present invention.
Figure 11:
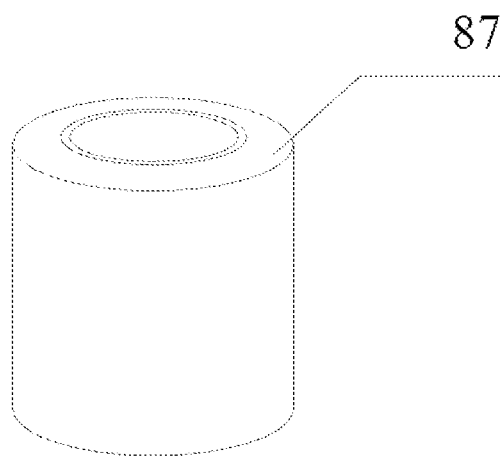
FIG. 11 is a schematic diagram of the structure of a fixed magnet of the present invention.
Figure 12:
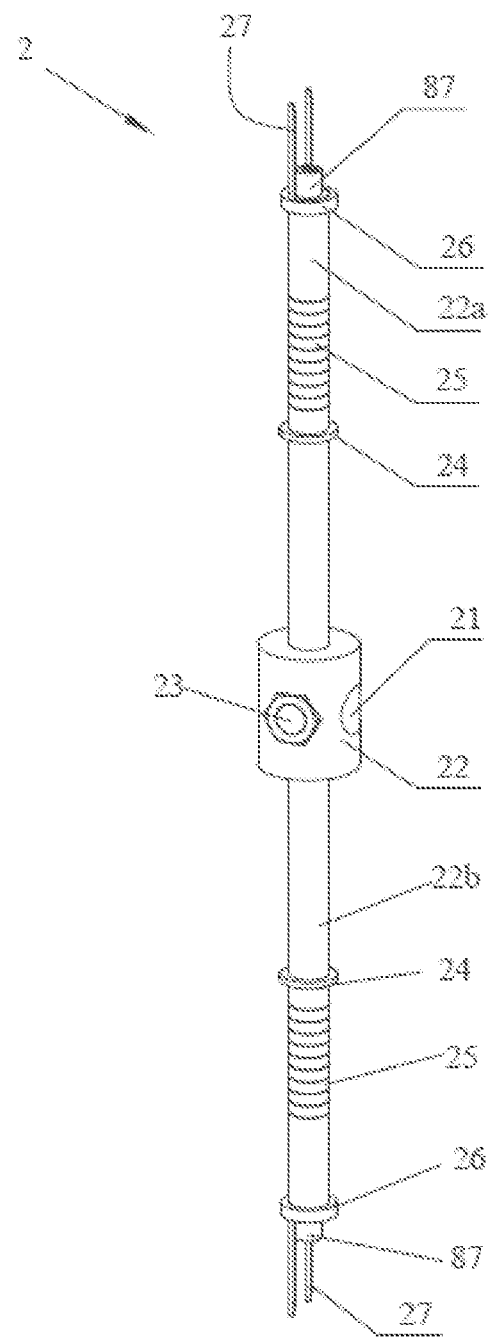
FIG. 12 is a schematic diagram of the structure of a vibration guide rod provided with a fixed magnet and a shift fork structure of the present invention.
Figure 13:
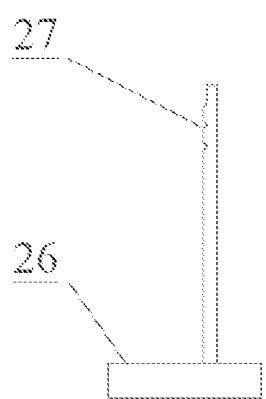
FIG. 13 is a schematic diagram of the structure of a shift fork of the present invention.

Referring to FIGS. 8-12, the device 100 of the present invention further includes a vibration device. The vibration device includes a vibration rod 1 and vibration guide rod 2 fixedly connected with the vibration rod 1. The vibration rod 1 includes a horizontal part 13 and a bending part 14 at each end of the horizontal part 13, the horizontal part 13 having a circular cross-section. The vibration guide rod 2 includes a guide rod 22 which is divided into an upper guide rod 22a and a lower guide rod 22b, each of the upper guide rod 22a and the lower guide rod 22b being provided with a ring-shaped magnet mounting groove 25 and an anti-release ring 24, as shown in FIG. 9 and FIG. 12. A ring-shaped magnet 86 is installed in the ring-shaped magnet mounting groove 25. The end of the upper guide rod 22a and the end of the lower guide rod 22b are respectively provided with a fixed magnet 87 and also provided with a shift fork structure 27 for driving the moveable magnet 38 to rotate as shown in FIG. 13. The shift fork structure 27 is fixed at the two ends of the vibration guide rod 2 through fixing rings 26. The upper guide rod 22a and the lower guide rod 22b of the vibration guide rod 2 respectively extend into the two sets of fixed sleeves 3 arranged opposite to each other up and down.

The reversible magnet 38 includes the rotation shaft 310 which is provided with a spring on it in a sleeving manner. One end of the spring is fixedly connected with the side wall of the cavity in the vertical sleeve 31, and the other end of the spring is fixedly connected with the reversible magnet 38. The reversible magnet 38 is provided with a shift lever 39 along the outer circumference of the rotating shaft 310, and there are four shift levers 39 which are equidistantly arranged on the outer circumference of the rotating shaft 310 in a circular shape. The shift fork structure 27 is provided with three to four semicircular groove structure matching with the shift lever 39 structure as shown in FIG. 13. The shift fork structure 27 can push the reversible magnet 38 to rotate along the rotating shaft 310 through the mating connection with the shift lever 39 when moving upwards with the vibration guide rod 2 along a longitudinal direction.

When the shift fork structure 27 moves downwards with the vibration guide rod 2, the reversible magnet 38 rotates back to its original positions under the action of the spring, and then, the moveable magnet 38 faces opposite to opposite pole of the fixed magnet 87 again.

Figure 14:
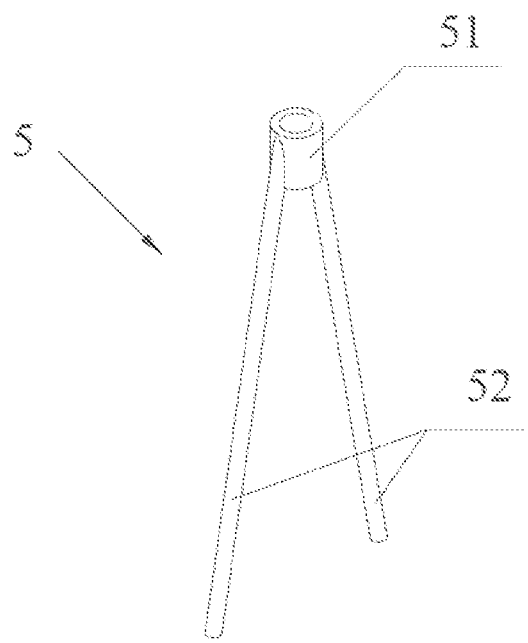
FIG. 14 is a schematic diagram of the structure of a rack of the present invention.

Referring to FIG. 14, the vortex-induced vibration power generation device 100 of the present invention further includes a base 6 and a rack 5 fixed on the base 6. The rack 5 includes legs 52 and a rack sleeve 51 fixed on the legs 52. The legs 52 are fixedly welded on the base 6, and the rack sleeve 51 is fixedly set on the upper fixed sleeve 3 in a sleeving manner by welding. The ends of the two vertical sleeves 31 of the lower fixed sleeve 3 are fixed on the base 6 by welding. The base 6 is used for fixing the whole power generation device.

The vibration rod 1 fits into the mounting hole 21 on the vibration guide rod 2 through the fixing hole 12 at its two ends, and then is fixedly connected through a bolt hole 23 on the vibration guide rod 2 (i.e., the fixing hole 12 extends into the mounting hole 21, and a bolt passes through the bolt hole 23 and the fixing hole 12 to fixedly connect the vibration rod 1 with the vibration guide rod 2). The vibration guide rod 2 includes the guide rod 22, which is divided into the upper guide rod 22a and the lower guide rod 22b, each of the upper guide rod 22a and the lower guide rod 22b being provided with a ring-shaped magnet mounting groove 25 and an anti-release ring 24, as shown in FIG. 9 and FIG. 12. The outer diameter of the anti-release ring 24 is the same as the inner diameter of the vertical sleeve 31 of the fixed sleeve 3, and larger than the inner diameter of the guide rail 42 of the linear bearing 4, so the vibration guide rod 2 will be restricted by the linear bearing 4 when moving up and down longitudinally. The ring-shaped magnet 86 is mounted at the ring-shaped magnet mounting groove 25 and the fixed magnet 87 is mounted at the two ends of the vibration guide rod 2, matching with each other through mutually internal and external threads. Meanwhile, the shift fork structure 27 is also fixed at the two ends of the vibration guide rod 2 respectively through the fixing ring 26. The outer diameter of the anti-release ring 24 on the vibration guide rod 2 is the same as the inner diameter of the vertical sleeve 31. The outer diameter of the anti-release ring 24 and the inner diameter of the vertical sleeve 31 are both larger than the inner diameter of the linear bearing 4. When vibration occurs, the linear bearing 4 is fixedly connected with the fixed sleeve 3 through the flange. The vibration guide rod 2 will not fall off from the fixed sleeve 3 due to the existence of the linear bearing 4. The number of the power generating coil 36 is several times of that of the ring-shaped magnet 86 to ensure that the ring-shaped magnet 86 can continuously cut the magnetic induction lines when drove by the vibration guide rod 2 vibrating up and down relative to the power generating coil 36. The motion of cutting magnetic lines caused by the relative motion will generate current which will be concentrated through circuits and stored.

Figure 15:
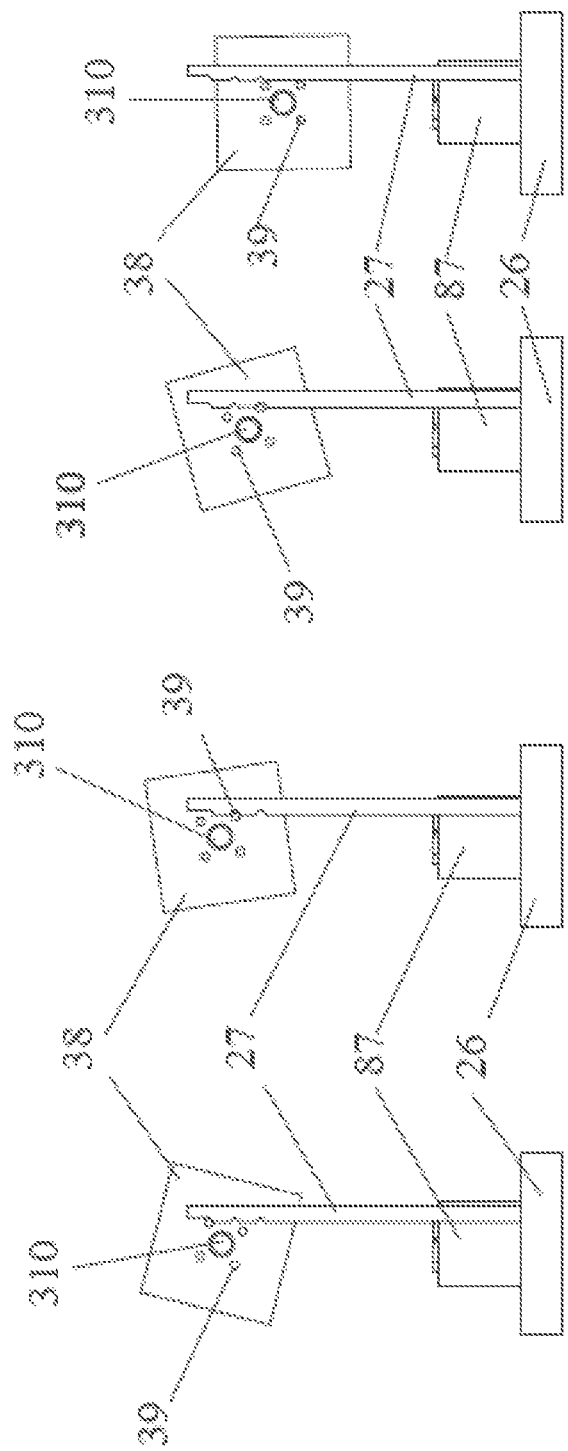
FIG. 15 is a schematic diagram of the movement that a shift fork drives a shift lever of the present invention.

Referring to FIG. 15, it illustrates a schematic diagram of the movement of the shift fork structure 27 and the reversible magnet 38 during the movement. From left to right, it indicates that the shift fork structure 27 moves upwards and drives the reversible magnet 38 to rotate 180 degrees along the rotation shaft 310.

The power generation device of the present invention will be placed in a corresponding water area. When water flows through it, the vibration rod 1 can vibrate up and down due to vortex-induced vibration, thereby drives the vibration guide rod 2 fixedly connected it to vibrate up and down. The vibration guide rod 2 drives the ring-shaped magnet 86 to do reciprocating motion in the cavity of the vertical sleeve 31 of the fixed sleeve 3. A large number of power generating coils 36 are mounted in the coil groove 34 of the fixed sleeve 3. When the ring-shaped magnet 86 and the power generating coil 36 do the reciprocating motion, an electric current can be generated. That is, when driving the vibration guide rods 2 to move, the vibration rod 1 moves relative to the fixed sleeve 3. The vibration mechanical energy is converted into electric energy using a form of power generation in which the array of the ring-shaped magnets 86 move relative to the power generating coil 36. When the vibration guide rod 2 moves up to the top of the vertical sleeve 31, the fixed magnet 87 and the moveable magnet 38 are opposite by different polarities and attract each other, and the attractive force accelerates the upward motion of the vibration guide rod 2. The shift fork structure 27 mounted at the end of the vibration guide rod 2 pushes the shift lever 39 on the reversible magnet 38, so as to drive the reversible magnet 38 to rotate along the rotation shaft 310. After the reversible magnet 38 rotates 180 degrees, the reversible magnet 38 and the fixed magnet 87 are opposite by the same polarities and repel each other. At this time, the reversible magnet 38 pushes the vibration guide rod 2 to move downwards. When the shift fork structure 27 moves downwards with the vibration guide rod 2, the reversible magnet 38 rotates back to the original position under the action of reset spring, and at this time, the reversible magnet 38 is opposite to the fixed magnet 87 by different polarities again, and so on and on. That is, after the shift fork structure 27 drives the reversible magnet 38 to rotate, the reversible magnet 38 can rotate back to its original position under the action of the spring. The vibration guide rod 2 is continuously and steadily moving back and forth under the action of the continuous conversion of the attractive force and the repulsive force at its two ends and the vortex-induced force generated by the ocean current energy.

The lengths of the shift fork structure 27 in the device 100 of the present invention can be adjusted according to the flow rate of the water area, which can change the phase difference in advance rotation of the reversible magnet 38, and in turn change the repulsive strength of the magnetic boundary. The vibration rod 1 and the vibration guide rod 2 are in the form of a structure that is easy to disassemble and can be quickly disassembled and replaced according to the average flow velocity of the installation environment, the density and other factors. When driving the vibration guide rod 2 to move, the vibration rod 1 generates a relative movement with the fixed sleeve 3, The vibration mechanical energy is converted into electric energy using a form of power generation in which the array of the ring-shaped magnets 86 move relative to the power generating coil 36.

The power generation device 100 of the present invention is to be installed at the seabed or the bottom of a river way or in a water area having a certain flow speed, and the installation direction should ensure that the vibration guide rod is axially perpendicular to the direction of the incoming flow. The energy of the water with a certain flow rate is converted into mechanical energy, and then into electrical energy. The rack 5 and the base 6 should be made of materials resistant to seawater corrosion or have corrosion-resistant surface treatment. The fixed magnet 87 and the reversible magnet 38 in the device have permanent magnetism.

In the present invention, the outer diameter and the weight of the vibration rod 1 can be determined according to the average flow rate of the actual water. The boundary damping of the vibration boundary can be changed by changing the magnetic fluxes of the fixed magnet and the reversible magnet. The sizes and installation distances of the reversible magnet can be changed according to the maximum amplitude of the vibration rod. By changing the length of the shift fork structure 27, it is possible to change the amount of advance rotation of the reversible magnet 38 during the upward movement of the vibrating guide 2, which in turn changes the magnitude of the suction force when the opposite polarities are opposite to each other.

Since the device is easy to install, highly adaptable, reliable and long-lived, and clean and pollution-free, it can be arranged in clusters in the relevant waters, and the current generated by multiple devices is processed and stored in a unified manner.

What is claimed is:

1. A vortex-induced vibration power generation device configured to generate electricity by converting ocean current energy into mechanical energy and converting the mechanical energy into electrical energy, the device comprising:
    (A) a fixation arrangement including a base and a rack fixedly connected to the base;
    (B) a frame including an upper portion and a lower portion, each of the upper and lower portions comprising a pair of sleeves and a connection rod extending between the pairs of sleeves, each of the sleeves having:
        a cavity extending from an open end to a sealed end;
        a rotatable magnet adjacent to the sealed end;
        a power generating coil mounted in a coil groove extending circumferentially along at least a portion of an inner wall of the cavity; and
        a sleeve flange extending radially outward from the open end;
    (C) a pair of vibration guide rods, each of the vibration guide rods including:
        a shaft extending from a first end to a second end;
        a pair of anti-release rings configured to restrict longitudinal movement of the vibration guide rods relative to the frame;
        a first and a second ring-shaped magnet mounting groove, the first ring-shaped magnet mounting groove extending circumferentially along at least a portion of an upper portion of the shaft and the second ring-shaped magnet mounting groove extending circumferentially along at least a portion of a lower portion of the shaft;
        a first ring-shaped magnet mounted in the first ring-shaped magnet mounting groove and a second ring-shaped magnet mounted in the second ring-shaped magnet mounting groove;
        a first fixed magnet fixedly attached to the first end of the shaft and a second fixed magnet fixedly attached to the second end of the shaft; and
        a first shift fork structure fixedly attached to the first fixed magnet and a second shift fork structure fixedly attached to the second fixed magnet, wherein each of the first and second shift fork structures is configured for driving rotation of one of the rotatable magnets; and
    (D) an oscillation rod extending from a first end to a second end, the first end of the oscillation rod coupled to a first one of the vibration guide rods and the second end of the oscillation rod coupled to a second one of the vibration guide rods,
    wherein the upper portion of the frame is fixedly coupled to the rack and the lower portion of the frame is fixedly coupled to the base.

2. The vortex-induced vibration power generation device of claim 1, wherein, in the fixation arrangement, the rack is fixedly coupled to the frame and to the base to prevent movement of the frame relative to the base.

* * * * *